United States Patent [19]

Richards

[11] E Re. 29,542

[45] Reissued Feb. 21, 1978

[54] POWER APPARATUS FOR TRUCK LOADING ELEVATOR

[75] Inventor: Lawrence I. Richards, Elk Grove Village, Ill.

[73] Assignee: Autoquip Corporation, Chicago, Ill.

[21] Appl. No.: 704,476

[22] Filed: July 12, 1976

Related U.S. Patent Documents

Reissue of:

[64] Patent No.: 3,880,259
Issued: Apr. 29, 1975
Appl. No.: 331,641
Filed: Feb. 12, 1973

[51] Int. Cl.[2] ..... B66B 11/04

[52] U.S. Cl. ..... 187/18; 254/9 C

[58] Field of Search ..... 187/2, 6, 17, 18; 182/63, 141; 298/11; 91/412, 171, 411 R, 411 B; 254/2 R, 2 B, 2 C, 10 R, 10 B, 10 C, 89 H, 120, 122, 9 R, 9 C

[56] References Cited

U.S. PATENT DOCUMENTS

| | | | |
|---|---|---|---|
| 2,764,869 | 10/1956 | Scherr | 91/171 |
| 2,940,262 | 6/1960 | Pfitzenmeier | 91/412 |
| 3,162,317 | 12/1964 | Becker | 187/18 |
| 3,301,348 | 1/1967 | Hiyama | 182/63 X |
| 3,598,366 | 8/1971 | Juds | 254/2 B |
| 3,619,007 | 11/1971 | Phillips | 298/11 |

*Primary Examiner*—John J. Love
*Assistant Examiner*—James L. Rowland
*Attorney, Agent, or Firm*—Darbo & Vandenburgh

[57] ABSTRACT

A dock lift has a platform connected at each side to a frame by a scissors apparatus. At one end, a pair of crossed hydraulic cylinders connect the platform and the frame. The hydraulic connections to the cylinders are made so that a load imposed on one side of the platform imposes a load on one cylinder which cylinder in turn causes fluid pressure to be applied to the other cylinder in the sense such that the other side of the platform is drawn downwardly to aid in maintaining the platform approximately level.

7 Claims, 4 Drawing Figures

POWER APPARATUS FOR TRUCK LOADING ELEVATOR

Matter enclosed in heavy brackets [ ] appears in the original patent but forms no part of this reissue specification; matter printed in italics indicates the additions made by reissue.

SUMMARY OF THE INVENTION

The present invention relates to a hydraulically operated dock lift having features to increase the stability of the platform and aid in making the conditions under which employees use the dock lift more safe.

DESCRIPTION OF THE SPECIFIC EMBODIMENT

Figure 1:
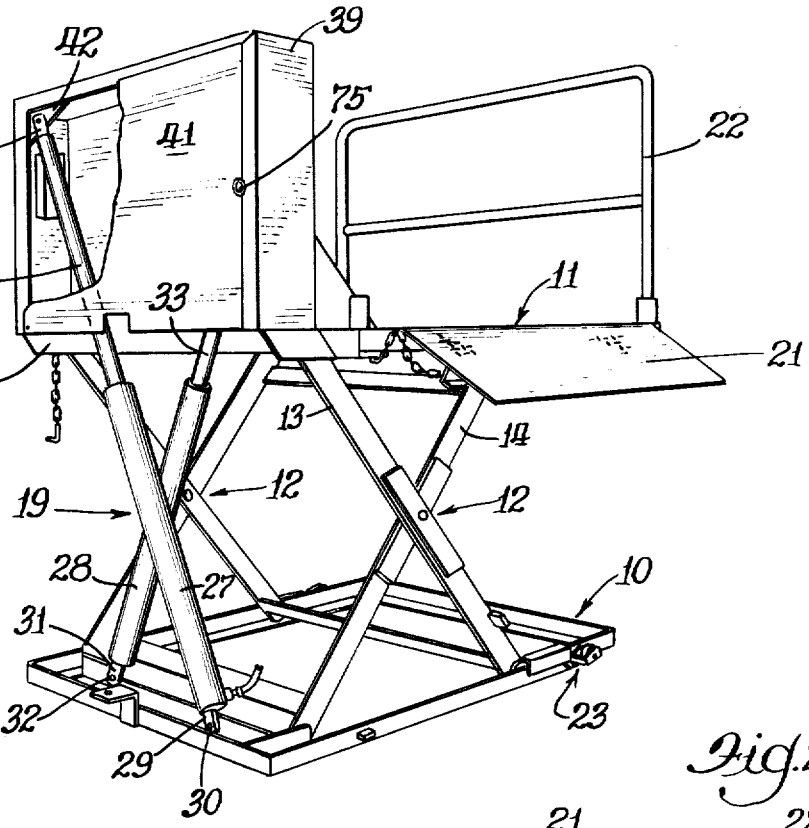
FIG. 1 is a perspective view of an embodiment of the invention.
Figure 2:
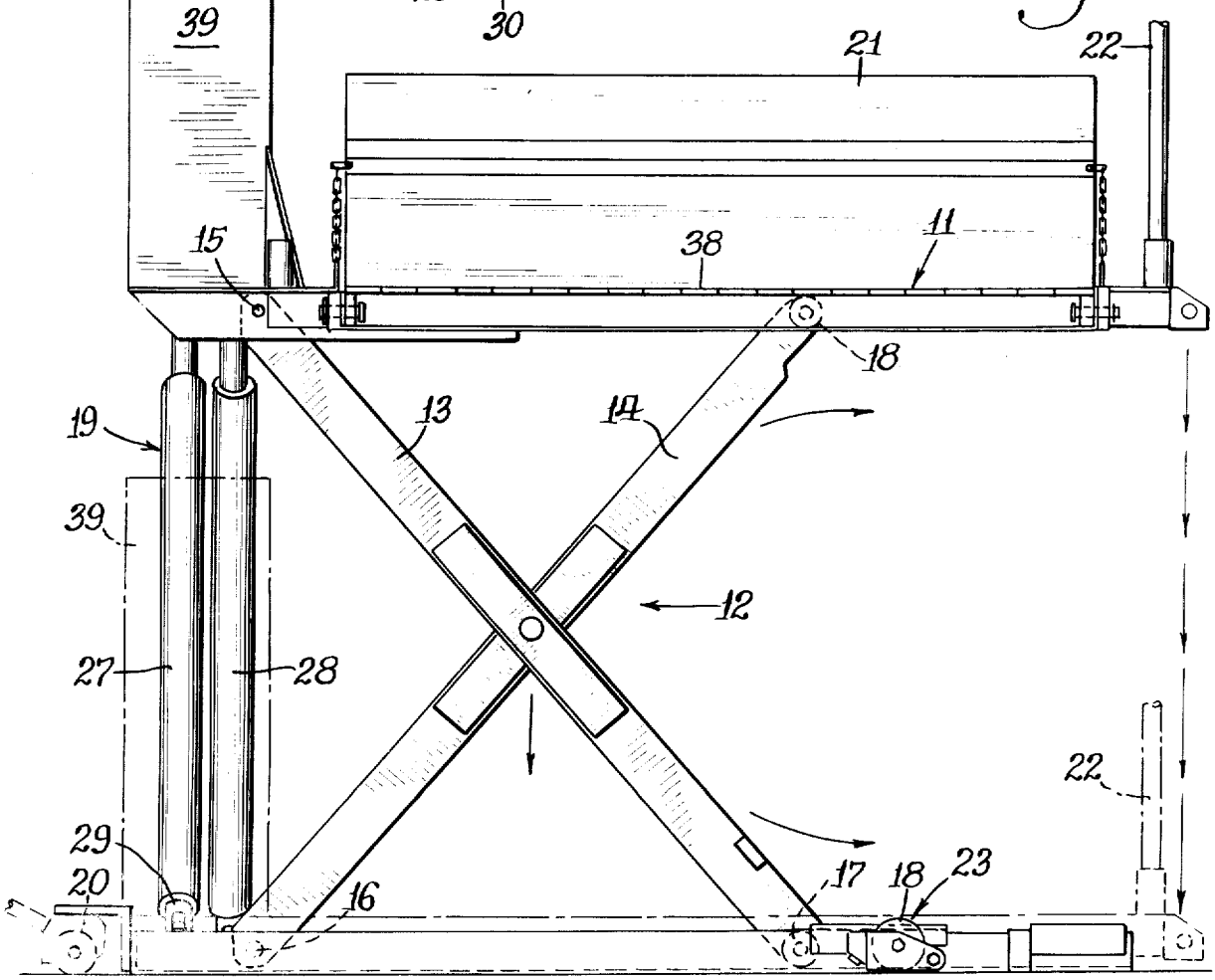
FIG. 2 is a side elevational view of the embodiment of FIG. 1 with the platform raised.

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

In the illustrated embodiment there is a base or frame, generally 10, above which is a platform, generally 11. At each side, the base and platform are connected by a scissors apparatus, generally 12. Each of these scissors apparatus comprises two levers 13 and 14. At one end the levers are pivotally connected to the platform and the base respectively, the pivot pins being designated 15 and 16. The other ends of the levers have wheels 17 and 18 which respectively bear on the base and platform. Adjacent one end, hydraulic power means, generally 19, interconnect the base and platform. A removable and dirigible wheel 20 can be mounted at one end of the base. Provision is also made at the other end of the base to selectively support the base on wheel structure so that it may be moved about. The platform is provided with dock boards 21 and a guard rail 22. As thus far described in this paragraph, the apparatus is conventional. The illustrated wheel structure, generally 23, on the base in opposition to dirigible wheel 20 is the subject matter of a copending application entitled Wheel Activator For Ambulatory Truck Loading Elevator, SN 331,640, filed Feb. 12, 1973 now U.S. Pat. No. 3,806,092 also being my invention.

In the disclosed embodiment the hydraulic power means 19 comprises a pair of hydraulic cylinders 27 and 28 respectively. Hydraulic cylinder 27 has a clevis 29 on its closed end, which clevis is pivotally connected by a pin 30 to the base 10. Similarly, a clevis 31 and pin 32 connect the closed end of cylinder 28 to the base 10. Extending from the open end of the cylinders are rams or piston rods 33 and 34 respectively with suitable seals between the piston rod and the wall of the cylinder at the open end. The piston rods are secured to pistons 35 and 36 (FIG. 4) within the cylinders.

Figure 4:
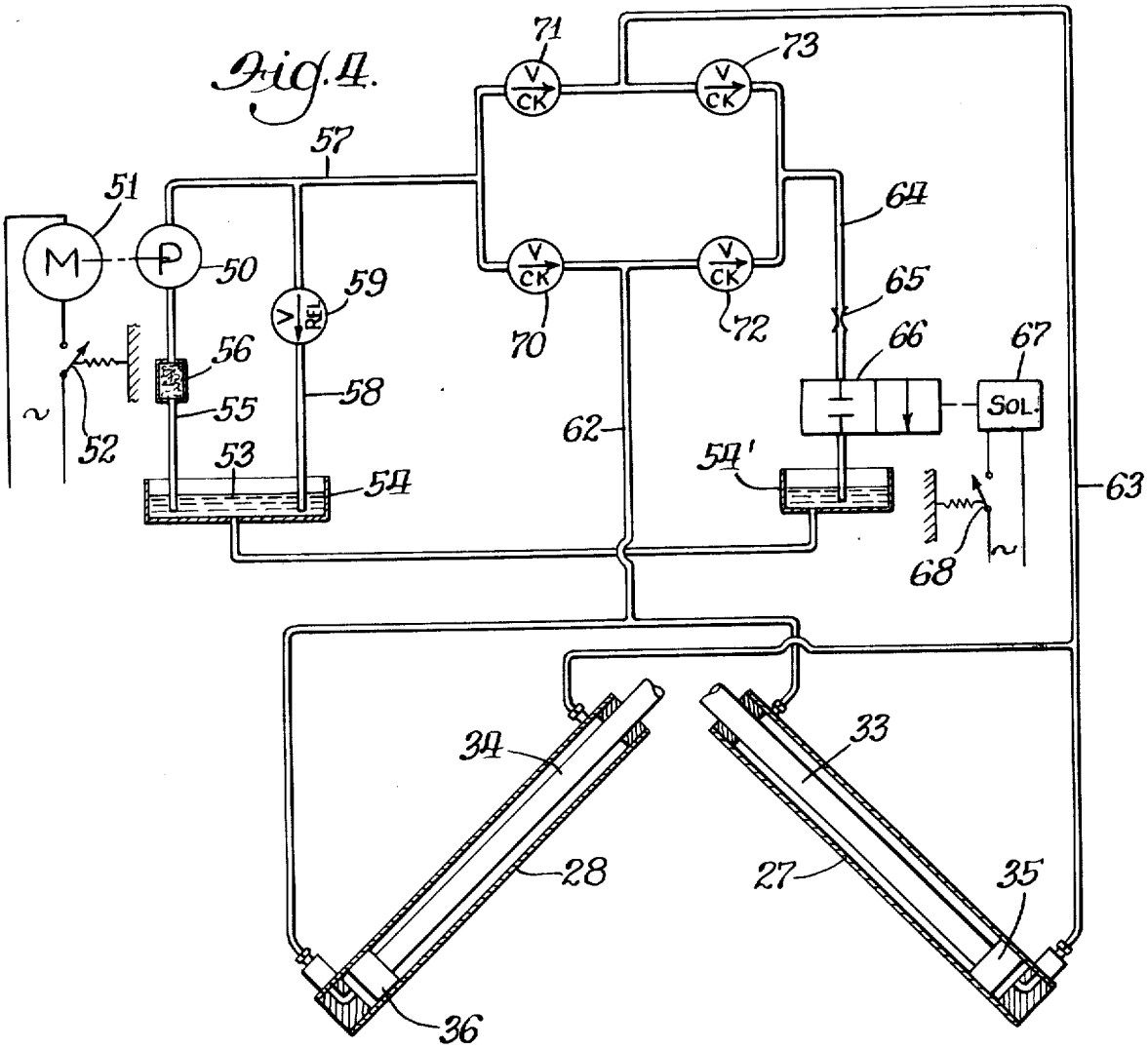
FIG. 4 is a schematic diagram of the power apparatus for the hydraulic cylinders.

A deck 38 and box-like enclosure 39 at one end of the deck form a structural part of platform 11. This enclosure has an open bottom 40. One side is formed by a removable panel or cover plate 41. At the top inside corners of the box are two gussets 42 and 43. At the distal end of piston rod 34 is a clevis 44 and at the top end of piston rod 33 is a clevis 45. These clevises are connected to gussets 42 and 43 by pins 46 and 47 respectively. The box enclosure 39 also may be employed to house the hydraulic pump with its motor, sump, etc. The hydraulic apparatus is schematically illustrated in FIG. 4. It comprises a hydraulic pump 50 which is driven by an electric motor 51. The motor is energized from a suitable source of electricity through a normally open switch 52. The pump draws hydraulic fluid 53 from a sump 54 through an intake line 55 having a filter 56 therein. The hydraulic fluid is delivered under pressure to a fluid supply line 57. Extending from supply line 57 to sump 54 is a return line 58 having a pressure relief valve 59 therein.

A first cylinder conduit 62 communicates with cylinder 27 adjacent the piston rod end thereof and with the hydraulic cylinder 28 at the closed end thereof. A second conduit 63 communicates with cylinder 27 at the closed end thereof and with cylinder 28 adjacent the piston rod end thereof. There is a fluid discharge line 64 that communicates with sump 54'. In actual practice, sumps 54 and 54' are a common sump or reservoir. In discharge line 64 is a flow control restriction 65 and a normally closed valve 66 operated by a solenoid 67. An electrical circuit including a normally open switch 68 connects to solenoid 67. By closing switch 68 solenoid 67 is energized to open valve 66.

A first check valve 70 connects supply line 57 and conduit 62 to permit the flow of hydraulic fluid only from the supply line to the conduit. A second check valve 71 connects supply line 57 with second conduit 63 to permit fluid flow only from the supply line to the conduit. A third check valve 72 connects first conduit 62 with discharge line 64 to permit fluid flow only from the conduit to the discharge line. A fourth check valve 73 connects second conduit 63 with discharge line 64 to permit fluid flow only from the conduit to the discharge line.

If the platform is to be raised from the lowered position (illustrated in FIG. 3) switch 52 is closed. This energizes motor 51 so that pump 50 supplies hydraulic fluid under pressure to supply line 57. This hydraulic fluid flows through check valves 70 and 71 to the bottom of the hydraulic cylinders and simultaneously to the tops of the hydraulic cylinders. However, since the bottom areas of pistons 35 and 36 are greater than the top exposed area of the two pistons (the top exposed areas being diminished by the presence of piston rods 33 and 34), the forces applied to the bottoms of the pistons is greater than that on the tops. Therefore, the pistons will move toward the upper ends of the cylinders. Thus, the piston rods move outwardly from the cylinder and the platform is thereby raised (the raised position being illustrated in FIG. 1).

When the desired elevation of the platform is achieved, switch 52 is released so that it automatically opens. Motor 51 and pump 50 stop. When it is desired to lower the platform, switch 68 is closed. This energizes solenoid 67 and opens valve 66 to permit fluid to flow from the cylinders through the two check valves 72 and 73 and the return line 64 to sump 54'. The rate of flow is dictated by the restriction 65. Thus, the platform 11 descends at the desired speed. Once set, normally the flow control 65 is not changed. The rate of descension will not change at any point along the path of movement of the platform.

Figure 3:
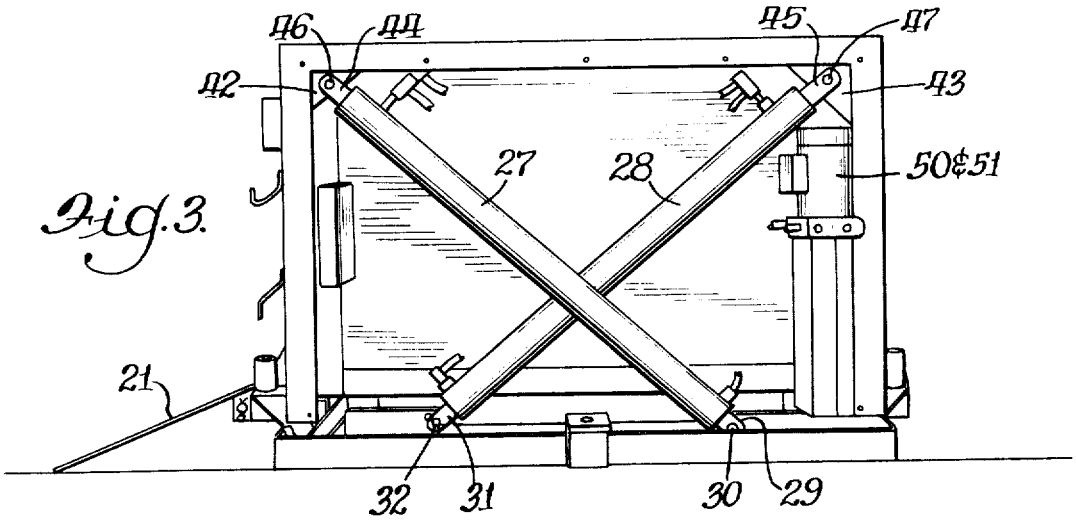
FIG. 3 is an end view with the platform lowered and a cover plate removed.

Assume that platform 11 has an unbalanced load applied to it, the unbalanced load being such that it is greater at the right side as viewed in FIG. 3, that is, at the near side as viewed in FIG. 1. This uneven load therefore tends to push down on piston rod 33 to a greater extent than it does on piston rod 34. Thus, the pressure on piston rod 34 tends to compress the fluid below piston 36. Through conduit 62 that fluid is applied to the top end of cylinder 27 and acts to apply a downward force to piston 35. At the same time, the same force applied to piston rod 34 tends to reduce the fluid pressure above piston 36. Through conduit 63 this reduction is communicated to the bottom end of cylinder 27 and again results in the tendency of the piston 35 to move downwardly. Thus the unbalanced, greater load applied to the cylinder attached to one side of the platform acts, through the hydraulic circuit, to apply a compensating force to the hydraulic cylinder attached to the other side of the platform. The conduits 62 and 63 at this time are blocked by check valves 70 and 71 and the closed valve 66.

If, as was the more common connection of two cooperating hydraulic cylinders, the bottom ends of the two cylinders were connected together to a common conduit and the top ends of the two cylinders were connected together to a second conduit, the action would be self-defeating rather than cooperating. That is, the pressure applied to one side of the platform would push down on the cylinder at that side of the platform. In turn, this would apply a fluid pressure to the bottom of the cylinder at the other side of the platform so that the other side of the platform would tend to go up. Thus the loading of one side actually would tend to cause more tipping of the platform, rather than less as is the case with the present invention.

Another important feature of the present invention is the use of the crossed hydraulic cylinders. This gives a lower overall height (whether the platform is raised or lowered), a feature that is often very important to dock lifts and the like, particularly ambulatory lifts. It provides a sway control against the platform moving from side to side to an extent that cannot be achieved by vertically positioned cylinders. This also enables the use of a single stage cylinder rather than multiple stage cylinders (two or more cavities and pistons therein). It is extremely difficult to obtain a constant rate of movement with multi-stage cylinders. An uneven movement in a lift or elevator is quite undesirable.

Some of the dock lifts presently in commercial use employ two vertically positioned hydraulic cylinders at one end of the platform. These cylinders are secured to the frame at the bottom while the top of the piston rod has a gear over which extends a chain connected at one end to the platform and the other end to the base. As compared to this type of unit, the embodiments of the present invention are extremely maintenance free and much less dangerous to employees who are using the lifts. All of the undesirabilities of the chain are eliminated. In addition, the upper end of the cylinders and exposed piston rods are enclosed by enclosure or housing 39 which also serves to enclose the motor, pump, valves, etc. By providing a suitable locking device 75, damage to, and pilferage of, such items can be guarded against. Without being able to operate the locking device 75 the panel 41 cannot be removed to obtain access to these items.

I claim:

[1. In an apparatus such as a dock lift or the like and for use with a source of hydraulic fluid under pressure, said apparatus comprising a frame having two sides and two ends, a vertically movable platform device above the frame and also having two corresponding sides and two corresponding ends, two pair of scissors means respectively connecting opposite sides of the frame and platform device, and power means at one end of the frame and connecting the frame and platform device for vertically moving the platform device with respect to the frame, the improvement comprising:]

[said power means comprising two hydraulic cylinders each cylinder having a closed end, a piston rod extending from the other end of the cylinder and connecting members on the closed end and the distal end of the piston rod, one of said cylinders having one member thereof pivotally secured to the frame at one side and the second member thereof pivotally secured to the platform device at the other side, the other of said cylinders having one member thereof pivotally secured to the frame at said other side and the second member thereof pivotally secured to the platform device at said one side, each cylinder having a first hydraulic connection adjacent the closed end thereof and a second hydraulic connection adjacent the other end thereof, said power means including two hydraulic fluid conduits, one of said conduits communicating with the first connection of one cylinder and the second connection of the other cylinder to provide fluid communication therebetween, the other of said conduits communicating with the second connection of said one cylinder and the first connection of said other cylinder to provide fluid communication therebetween, whereby a load imposed on said platform at a first side thereof will push down on the hydraulic cylinder connected to said first side of the platform which hydraulic cylinder will in turn act through the respective communication to energize the other hydraulic cylinder to apply a downward pulling force on the other side of the platform.]

2. In an apparatus as set forth in claim [1] *8*, wherein the members attached to the piston rods are secured to the platform device, and said hydraulic cylinders each are a single stage unit.

3. In an apparatus as set forth in claim [1] *8*. wherein said platform device includes a deck with an enclosure at said one end of the device and extending above the level of the deck, said enclosure extending between said sides and having a top and an open bottom, said hydraulic cylinders extending into said enclosure through said open bottom, the piston rod members being attached adjacent said top immediately adjacent the respective sides.

4. In an apparatus as set forth in claim [1] *8*, wherein said power means includes a fluid supply line, a fluid discharge line, and four check valves, one check valve being between the supply line and the first conduit to permit flow only in the direction toward the first conduit, the second check valve being between the supply line and the second conduit to permit flow only in the direction toward the second conduit, the third check valve being between the first conduit and the discharge line to permit flow only in the direction toward the discharge line, the fourth check valve being between the second conduit and the discharge line to permit flow only in the direction toward the discharge line, and a manually operable valve means in said discharge line to control the fluid flow therethrough.

5. In an apparatus as set forth in claim [1] *4*, wherein the source of hydraulic fluid is a fluid pump driven by an electric motor, said pump supplying fluid to said first and second check valves without the presence of an accumulator therebetween; and including control means connected to said motor to energize and deenergize the same;

whereby said platform is raised only by operating said control means to energize said motor.

[6. In an apparatus such as a dock lift or the like comprising a frame having two sides and two ends, a vertically movable platform device above the frame and also having two corresponding sides and two corresponding ends, two pair of scissors means respectively connecting opposite sides of the frame and platform device, and power means at one end of the frame and connecting the frame and platform device for vertically moving the platform device with respect to the frame, and for use with a source of hydraulic fluid under pressure, the improvement wherein said power means comprises:]

[two hydraulic cylinders each having a closed end, a piston rod extending from the other end, a first hydraulic connection adjacent the closed end thereof, and a second hydraulic connection adjacent the other end thereof;]

[two hydraulic fluid conduits, one of said conduits communicating with the first connection of one cylinder and the second connection of the other cylinder to provide fluid communication therebetween, the other of said conduits communicating with the second connection of said one cylinder and the first connection of said other cylinder to provide fluid communication therebetween;]

[whereby a load imposed on said platform at a first side thereof will push down on the hydraulic cylinder connected to said first side of the platform which hydraulic cylinder will in turn act through the respective communication to energize the other hydraulic cylinder to apply a downward pulling force on the other side of the platform.]

7. In an apparatus as set forth in claim [6] *9*, wherein said power means includes a fluid supply line and a fluid discharge line, and four check valves, one check valve being between the supply line and the first conduit to permit flow only in the direction toward the first conduit, the second check valve being between the supply line and the second conduit to permit flow only in the direction toward the second conduit, the third check valve being between the first conduit and the discharge line to permit flow only in the direction toward the discharge line, the fourth check valve being between the second conduit and the discharge line to permit flow only in the direction toward the discharge line, and a manually operable valve means in said discharge line to control the fluid flow therethrough.

*8. In an apparatus such as a dock lift or the like and for use with a source of hydraulic fluid under pressure, said apparatus comprising a frame having two sides and two ends, a vertically movable platform device above the frame and also having two corresponding sides and two corresponding ends, two pair of scissors means respectively connecting opposite sides of the frame and platform device, and power means at one end of the frame and connecting the frame and platform device for vertically moving the platform device with respect to the frame, the improvement comprising:*

*said power means comprising two hydraulic cylinders each cylinder having a closed end, a piston rod extending from the other end of the cylinder and connecting members on the closed end and the distal end of the piston rod, one of said cylinders having one member thereof pivotally secured to the frame at one side and the second member thereof pivotally secured to the platform device at the other side, the other of said cylinders having one member thereof pivotally secured to the frame at said other side and the second member thereof pivotally secured to the platform device at said one side, each cylinder having a first hydraulic connection adjacent the closed end thereof and a second hydraulic connection adjacent the other end thereof, said power means including two hydraulic fluid conduits, one of said conduits communicating with the first connection of one cylinder and the second connection of the other cylinder to provide fluid communication therebetween, the other of said conduits communicating with the second connection of said one cylinder and the first connection of said other cylinder to provide fluid communication therebetween, fluid supply line means through which hydraulic fluid flows from said source when said platform device is to be raised and through which hydraulic fluid returns from said cylinders when said platform device is to be lowered, and means connecting the fluid supply line means and said conduits for preventing hydraulic fluid from flowing from said one of said conduits to said other of said conduits when the platform device is not being raised or lowered, whereby a load imposed on said platform at a first side thereof will push down on the hydraulic cylinder connected to said first side of the platform which hydraulic cylinder will in turn act through the respective communication to energize the other hydraulic cylinder to apply a downward pulling force on the other side of the platform.*

*9. In an apparatus such as a dock lift or the like comprising a frame having two sides and two ends, a vertically movable platform device above the frame and also having two corresponding sides and two corresponding ends, two pair of scissors means respectively connecting opposite sides of the frame and platform device, and power means at one end of the frame and connecting the frame and platform device for vertically moving the platform device with respect to the frame, and for use with a source of hydraulic fluid under pressure, the improvement wherein said power means comprises:*

*two hydraulic cylinders each having a closed end, a piston rod extending from the other end, a first hydraulic connection adjacent the closed end thereof, and a second hydraulic connection adjacent the other end thereof;*

*two hydraulic fluid conduits, one of said conduits communicating with the first connection of one cylinder and the second connection of the other cylinder to provide fluid communication therebetween, the other of said conduits communicating with the second connection of said one cylinder and the first connection of said other cylinder to provide fluid communication therebetween;*

*fluid supply line means through which hydraulic fluid flows from said source when said platform device is to*

*be raised and through which hydraulic fluid returns from said cylinders when said platform device is to be lowered; and*

*means connecting the fluid supply line means and said conduits for preventing hydraulic fluid from flowing from said one of said conduits to said other of said conduits when the platform device is not being raised or lowered;*

*whereby a load imposed on said platform at a first side thereof will push down on the hydraulic cylinder connected to said first side of the platform which hydraulic cylinder will in turn act through the respective communication to energize the other hydraulic cylinder to apply a downward pulling force on the other side of the platform.*

* * * * *